United States Patent [19]

Wickramasinghe

[11] Patent Number: 4,941,753
[45] Date of Patent: Jul. 17, 1990

[54] ABSORPTION MICROSCOPY AND/OR SPECTROSCOPY WITH SCANNING TUNNELING MICROSCOPY CONTROL

[75] Inventor: Hemantha K. Wickramasinghe, Chappaqua, N.Y.

[73] Assignee: International Business Machines Corp., Armonk, N.Y.

[21] Appl. No.: 334,833

[22] Filed: Apr. 7, 1989

[51] Int. Cl.$^5$ .................. G01K 1/16; G01N 25/00
[52] U.S. Cl. .................. 374/120; 374/137; 374/163; 374/141; 374/210; 250/306; 250/307; 324/158 D
[58] Field of Search .................. 374/6, 45, 120, 124, 374/137, 141, 163, 183, 210; 250/306, 307; 324/158 R, 158 D, 451, 452

[56] References Cited

U.S. PATENT DOCUMENTS

| | | | |
|---|---|---|---|
| 4,658,138 | 4/1987 | Koike et al. | 250/306 |
| 4,668,865 | 5/1987 | Gimzewski et al. | 250/306 |
| 4,837,435 | 6/1989 | Sakuhara et al. | 250/306 |
| 4,841,148 | 6/1989 | Lyding | 250/307 |

FOREIGN PATENT DOCUMENTS

| | | | |
|---|---|---|---|
| 62-139240 | 6/1987 | Japan | 250/306 |
| 63-66838 | 3/1988 | Japan | 250/306 |

*Primary Examiner*—William A. Cuchlinski, Jr.
*Assistant Examiner*—Diego F. F. Gutierrez
*Attorney, Agent, or Firm*—Pollock, Vande Sande & Priddy

[57] ABSTRACT

High resolution absorption microscopy, spectroscopy and similar applications are implemented by providing for a measurement tip which is maintained spaced from a sample under investigation sufficiently close so as to equalize thermal levels in the tip and the sample; generally within about 10 Angstroms. Energy is applied to the sample being investigated and either a steady state or dynamic junction potential is measured. The junction potential is representative of local sample temperature. The close separation can be maintained by techniques employed in scanning tunneling microscopy, atomic force microscopy or capacitance microscopy. In the event the close separation is maintained using scanning tunneling microscopy techniques, then a switching arrangement is provided for connecting a conductive film (either of the sample or supported on a sample) to either a suitable potential or ground and simultaneously connecting the STM tip either in a feedback loop or to a device for measuring the junction potential. The feedback loop, in addition to conventional operational amplifier components, includes a sample and hold element to maintain the input voltage to an operational amplifier in the feedback loop during those times that the measurement tip is connected to the junction potential measurement device, as opposed to being connected in the STM feedback loop. The spectroscopy application uses similar architecture, althrough the energy source is tunable.

22 Claims, 3 Drawing Sheets

ABSORPTION MICROSCOPY AND/OR SPECTROSCOPY WITH SCANNING TUNNELING MICROSCOPY CONTROL

TECHNICAL FIELD

The invention relates to high resolution absorption microscopy and spectroscopy

BACKGROUND ART

Various techniques for high resolution microscopy followed from the scanning tunneling microscope and its progeny. Generically, scanning tip microscopies are based on the ability to piezoelectrically control the position of a tip to Angstrom accuracies using feedback techniques. In this regard, see U.S. Pat. Nos. 3,973,122; 4,343,993; 4,522,510; 4,747,698; PCT/CH87/00166; Kinoshita, "Sons of STM", *Scientific American, July 1988*; Hansma et al, "Scanning Tunneling Microscopy and Atomic Force Microscopy: Application to Biology and Technology", *Science*, Oct. 14, 1988, page 209; Matey, "Scanning Capacitance Microscopy", *SPIE.*, Vol. 897, page 110, 1988 and Martin et al, "Tip Techniques for Microcharacterization of Materials", *Scanning Microscopy*, Vol 2, No. 1, 1988.

Scanning absorption microscopy is a prior art technique. Typically, the technique employs a pump radiation beam which is incident on the object to be investigated. Some of this incident energy is absorbed by the object, resulting in a temperature rise. The spatial variation of temperature across the object represents variations in the absorption of the object caused by the incident radiation. These temperature variations can be mapped using a temperature-sensitive probe. One example of a temperature-sensitive probe is a thermocouple; a more recent example of bolometric measurement is found in the scanning thermal profiler of Wickramasinghe and Williams Patent 4,747,698.

Notwithstanding the availability of these prior art techniques, there is a desire for enhancing the resolution of the instrument. Thus it is an object of the present invention to enhance or improve the resolution for scanning absorption microscopy and spectroscopy by at least an order of magnitude.

In accordance with one preferred embodiment of the invention, a tunneling tip is employed, in part, for temperature sensing A sample (an object under measurement) may be supported on a substrate and, if the sample is not conductive, it carries on a surface, opposite the surface in contact with the substrate, a thin conductive coating. An incident energy wave (which might be acoustic, optical or other) impinges on the sample through the substrate which is transparent to the incident radiation. The incident energy is absorbed by the sample and causes local temperature variations across its surface. If a surface coating is necessary (in the case where the sample itself is not conductive), a suitable conductive coating might be a thin (for example 10 Angstroms) film such as carbon or platinum. With this or any other coating which is thin enough, the temperature variations across the sample will be transferred through the conducting film to the exposed surface of the film. A tunneling tip is brought close to the available surface (either the surface of a conducting film, if present, or a surface of the sample) and positioned about 5 Angstroms over the available surface. Tunneling current is used as a control mechanism via a feedback loop to maintain the separation between the tip and the available surface. By reason of the small separation between the available surface and the tunneling tip, the tip will be in thermal equilibrium with the available surface at the point being investigated. The apparatus at this point is suddenly switched out of the tunneling mode (the tunneling feedback loop is opened) and into a mode where the junction potential between the tip and the available surface of the sample is measured. The measurement provides an accurate measurement of the temperature at the point being investigated. The temperature of other points across the sample can be mapped as the tip tracks over the sample surface after again closing and then opening the tunneling feedback loop.

While it is possible to measure the DC junction potential (as a measure of steady state temperature), it may be advantageous to dynamically measure temperature by modulating the pump power at some frequency, for example by using short pulses, or a burst of short pulses at some given repetition rate (typically around a kilohertz) within the response of the tunneling tip sensor and detecting the AC component of the junction potential at the same repetition rate. The repetition rate is selected at a low enough frequency so that enough time is left over for the one micron spot on the sample to cool down through thermal diffusion into the high diffusivity substrate (which might for example be sapphire, a diamond or diamond coating) before the next heating period. This allows an increase in the contrast of the thermal signals from the background and also can eliminate effects due to temperature fluctuations caused by the environment.

Although in the embodiment just described, tunneling was employed as the control mechanism to maintain the close separation between the measurement tip and the available surface, use of the tunneling mechanism is not essential to maintain this separation. Rather, other techniques such as atomic force microscopy or capacitance microscopy can also be used. With these techniques the separation between the tip and the available surface can be continuously controlled without having to switch the feedback loop off during measurement of the thermoelectric signal.

The thermal equilibrium between the measuring tip and the available surface at the junction region comes about because the measurement tip is so close to the available surface that the electronic states in the tip and the surface are strongly coupled so the Fermi levels have to equalize at the junction. If the metal of the measurement tip and the available surface have different work functions, there will be a corresponding step in the vacuum level at the junction. This step is precisely the contact potential which is the difference in the work functions of the two metals. The temperature sensitivity results from the fact that the work functions of the two metals increase differently with temperature. The response time of the junction potential to temperature is limited by electron diffusion and in this case will be in the picosecond range although in practice the electronic detection circuitry will limit the response time to much lower values. For example, for a tungsten tip and a platinum film surface, the sensitivity is around 10 microvolts per degree Centigrade and the typical junction contact resistance is a few 10's of ohms for a contact diameter of 10 Angstroms. The temperature spatial resolution which could be achieved in this case can be as small as a tip diameter atomic dimension such as two Angstroms) and will in practice be limited by the signal to noise ratio. The absorption imaging resolution achievable as described, on the other hand, will be limited by the thickness of the conducting film deposited on the sample surface (if present) which transfers the thermal image and can be made as small as 10 Angstroms.

Rather than using a cross TM section in which the measurement tip is adjacent the available surface (either the surface of the sample if it is conductive or a conductive film deposited on an upper surface of the sample) and the sample is supported by the substrate, with the energy directed at the sample through the substrate, a different arrangement may be used. For cases such as samples comprising a thin biological film or a thin dielectric film (typically less than 2 nm) or both, the cross-section can be altered as follows. The thermal measurement tip is adjacent a surface of the thin biological film which is supported on a conductive film. The tunneling, in this case, takes place between the tip and the conducting film through the biological sample. The energy for heating the sample is directed toward the same surface of the biological sample adjacent the measuring tip.

Embodiments such as those described above should achieve resolutions of a nanometer ($10^{-9}$ meters) or better for absorption microscopy. Furthermore, by tuning the frequency of the incident radiation, absorption spectroscopy with similar, nanometer spatial resolution is possible.

Accordingly, the invention provides apparatus for absorption measurements comprising:
a sample with a conductive surface,
means for supporting said sample for measurement,
means for directing energy onto said sample to cause local heating of the sample,
a thermal measurement tip,
support means for maintaining said thermal measurement tip within about 10 Angstroms of said conductive surface, and
measurement means for measuring a junction potential between said measurement tip and said conductive surface.

The invention also comprises:
a method or effecting absorption measurements comprising:
(a) supporting a sample with a conductive surface for measurement,
(b) directing energy onto said sample to cause local heating of the sample,
(c) supporting a thermal measurement tip sufficiently close to said conductive surface to equalize Fermi levels between said tip and surface, and
(d) measuring a junction potential between said thermal measurement tip and said conductive surface.

BRIEF DESCRIPTION OF THE DRAWINGS

The present invention will now be further described so as to enable those skilled in the art to make and use the same in the following portions of this specification when taken in conjunction with the attached drawings. In the attached drawings.

DETAILED DESCRIPTION OF PREFERRED EMBODIMENTS

Figure 1:
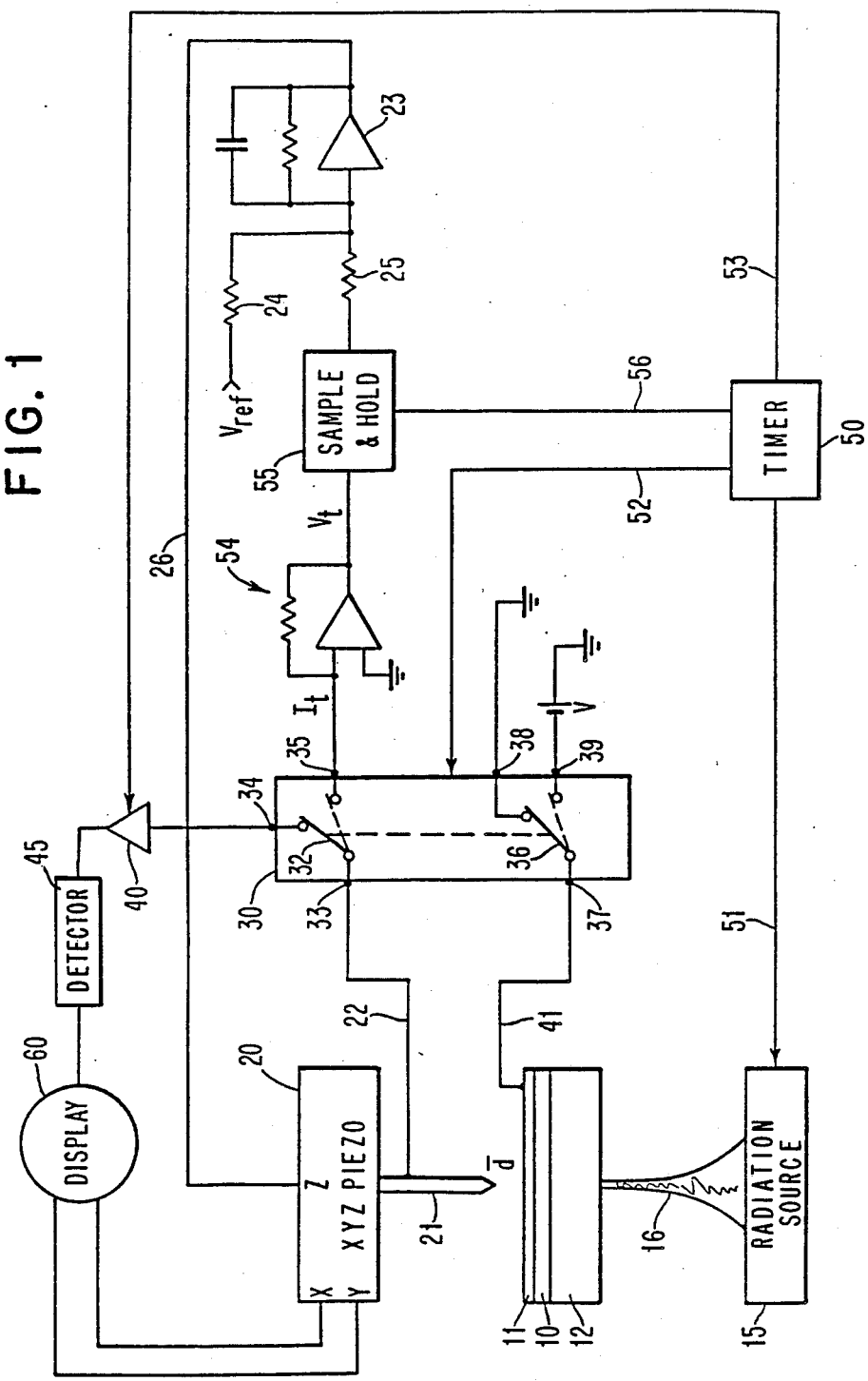
FIG. 1 is a schematic of one embodiment of the invention for performing absorption microscopy using the tunneling mechanism.

FIG. 1 is a schematic of one preferred embodiment of the invention for effecting absorption microscopy. In FIG. 1 a sample 10 to be investigated is supported on a substrate 12. In the example shown in FIG. 1, the sample 10 is non-conductive and a thin conducting film 11 is coated on an available surface of the sample 10. A thermal measurement tip 21 (which has characteristics similar to the tunneling tip in a STM) is supported for three-dimensional movement by a XYZ piezoelectric drive 20. A conductor 22 is connected to both the measurement tip 21 and to a terminal 33 of a switching arrangement 30. A conductor 41 is connected to the conductive film 11 and to a terminal 37 of the switching arrangement 30. The switching arrangement 30 has two movable contacts 32 and 36 which move together. With the contacts in the full line position, contact 32 connects terminals 33 and 34 while contact 36 connects terminals 37 and 38. In the dashed line position, contact 32 connects terminals 33 and 35 and contact 36 connects terminals 37 and 39. Terminal 38 is connected to ground while terminal 39 is connected to a suitable potential. Terminal 35 is connected via a current-voltage amplifier 54 and a sample and hold circuit 55 to the input of circuitry associated with an amplifier 23 in a STM tunneling feedback loop. The STM tunneling feedback loop includes the measurement tip 21, the conductor 22, the terminal 33, the contact 32, the terminal 35, the current-voltage amplifier 54, the sample and hold circuit 55, the resistor 25, the amplifier 23, the conductor 26, to the Z input terminal of the XYZ piezoelectric drive 20. The function of the STM tunneling feedback loop is to maintain the separation d between an extreme point of the measurement tip 21 and the available surface of the sample. In the example shown in FIG. 1, since the sample 10 has a film 11 supported thereon, the separation d is measured between the extreme end of the measurement tip 21 and the available surface of the film 11. In other embodiments where the sample 10 is conductive, the film 11 would be absent and thus the separation d will be measured between an extreme end of the measurement tip 21 and the available surface of the sample 10. The STM tunneling feedback loop maintains the separation d by comparing the voltage developed at the resistor 25 (by the tunneling current driven by the potential source v across the separation d and through the current-voltage converter) with the voltage $v_{ref}$ coupled by the resistor 24 to an input of the amplifier 23.

Based on the foregoing, and on the description of the operation of a scanning tunneling microscope provided in U.S. Pat. No. 4,343,993 (the subject matter of which is incorporated herein by this reference), it should be apparent that so long as the contacts 32 and 36 are in the dashed line position, the tunneling feedback loop will maintain the separation d between an extreme end of the measurement tip 21 and the available surface and/or film. Suitable separations d for purposes of this invention are on the order of 10A, a distance small enough so that there is thermal equilibrium between tip and surface.

The source 15 is provided to generate and focus radiation, represented at 16, onto the sample 10. For the geometry shown in FIG. 1, that energy is incident on the sample 10 through the substrate 12; therefore the substrate is arranged to be relatively transparent to the energy generated by the source 15. The source 15 and its associated focusing structures can take on a variety of forms. In one embodiment, the source 15 is a laser with associated optical focusing arrangement. Alternatively, the source 15 could be a microwave generator (10 gHz for example) with conventional focusing apparatus. As further alternatives, the source 15 could be an x-ray source or an ultrasonic source with, again, associated conventional focusing structures. The purpose for the incident radiation is to cause local heating at the sample 10 to allow temperature variations in the sample to be measured as a consequence of that local heating.

Timer 50 provides, along conductor 51, a modulating signal for modulating the source (15) power at a repetition frequency selected at a low enough frequency so that enough time is left over for the irradiated spot on the sample to cool down through thermal diffusion into the high diffusivity substrate 12, typically at a frequency of approximately 1 KHz. The timer 50 provides the modulating signal at the repetition frequency. Alternatively, the timer may provide a burst of short pulses, where the bursts repeat at the repetition frequency.

Timer 50 provides a control signal, over conductor 52, to control the position of the switching arrangement 30. Thus at times the switching arrangement 30 is controlled to alter the position of contacts 32 and 36 from the dashed line position to the full line position. Simultaneously with the control signal over conductor 52, the timer 50 provides a control signal along conductor 56 to the sample and hold circuit 55 to switch from the continuous sampling mode (for $v_t$) to the hold mode as the switching arrangement 30 changes to the full line position. This allows the integrating amplifier 23 to hold its voltage output to the Z-piezo and consequently the Z position of the tip when the tunneling feedback loop is opened and the junction potential is being measured. In the full line position, contact 36 effectively grounds the film 11. At the same time, the potential from the tip 21 is applied via the conductor 22 through the contact 32, in its full line position, via the terminal 34 to the amplifier 40. The amplifier 40 may be enabled by a control signal on the conductor 53 simultaneous with the control of the switching arrangement to its full line position. With the film 11 grounded, the potential measured at the tip 21 (which is the potential applied to the input of the amplifier 40) is the junction potential between the tip 21 and the conductive surface 11. The output of amplifier 40 is provided to detector 45 such as a lock-in detector in order to detect the value of this potential and the output of the detector 45 is applied as an input to the display 60. Accordingly, with the switching arrangement 30 in the full line condition, the display 60 will indicate the junction potential (between the tip 21 and the film 11) at the x-y position of the tip, as indicated by the signals on the x and y inputs of the display 60.

By moving the tip 21 across the surface of the sample, using signals input to the x and y inputs of the xyz piezoelectric drive 20, with the switching arrangement 30 in its dashed line position, the tunneling tip can be caused to map the surface of the sample with the tunneling tip maintained at the separation d. For each point at which a temperature measurement is desired, the condition of the switching arrangement 30 is cycled to its full line position and then back to the dashed line position. In the full line position of switch 30, the junction potential at that point can be measured so as to map the junction potential of the available surface.

The control signals from timer 50 cycles the switching arrangement 30 at a frequency at least ten times higher than the repetition frequency of the modulating signal provided along conductor 51, typically at a frequency of at least 10 KHz.

In the case of a conductive sample 10, there is no need for film 11 and so the measurement depends on the tip to sample potential.

If $\delta T$ is the temperature excursion at a point on the sample caused by the incident energy, $\sigma$ is the sensitivity of the junction potential to temperature variation and $R_j$ is the tip to sample junction resistance, we can write the S/N ratio (in the case where the contact potential is measured by a high impedance amplifier) as:

$$(S/N)_v = \delta T \sigma / \sqrt{4\pi K T R_j \Delta f}$$

where K=Boltzmans constant, T=Absolute temperature and $\Delta f$=Detection bandwidth. With $\sigma$= 10 uv/deg C, R=100 Ohm, T=300K and S/N=1, we can find the minimum detectable temperature, $\Delta t_{min}$=0.0001 deg C.

The highest spatial resolution that can be achieved will depend on S/N which in turn depends on the highest thermal contrast that can be achieved. In order to get the highest temperature excursion from an absorbing region of spatial extent $\delta a$, the pulse width must be short enough so that all the energy dumped into the absorbing region gets absorbed without diffusion during the pulse interval This gives an expression which relates the pulse width $\delta t$ to the resolution $\delta a$ through the effective thermal diffusion length in the sample.

$$\delta a = [2K\delta t/\pi \rho C]^{\frac{1}{2}}$$

where K is the thermal conductivite, $\delta t$ is the pulse width and $K/(\rho C)$ is the thermal diffusivity. This suggests that with pulses in the ps range, it should be possible to obtain absorption across nm regions without thermal diffusion limiting the temperature rise. If $\delta a$ is the differential absorption coefficient over the average value in the sample at the point being investigated, I is the flux intensity incident on the object over a time $\delta t$, $\rho$ is the density and C is the specific heat of the object, we can write an expression for the temperature increment $\Delta T$:

$$\Delta T = \delta a I \delta t / \rho C$$

With ps pulses of 100 W peak power focused to 1 micron and consider a biological sample with a differential optical absorption coefficient from its surroundings of 100,000/meter, an estimated peak temperature rise of 2 degrees centigrade is obtained. This is four orders of magnitude higher than the detection limit for temperature measurement. It should however be pointed out that the system will also operate with much broader pulses in the $\mu$s or even ms range with reduced temperature rise.

Another way to detect temperature dependent work function changes would be to vibrate the tip in the Z axis direction at a frequency outside the band of the tunneling control loop while the loop is closed, and measure the component of tunneling current at the vibration frequency. This signal will be proportional to $\sqrt{((\phi_w + \phi_{pt})/2)}$. However this signal varies more slowly with temperature and in addition cannot respond to temperature variations faster than the tip vibration frequency.

Figure 2:
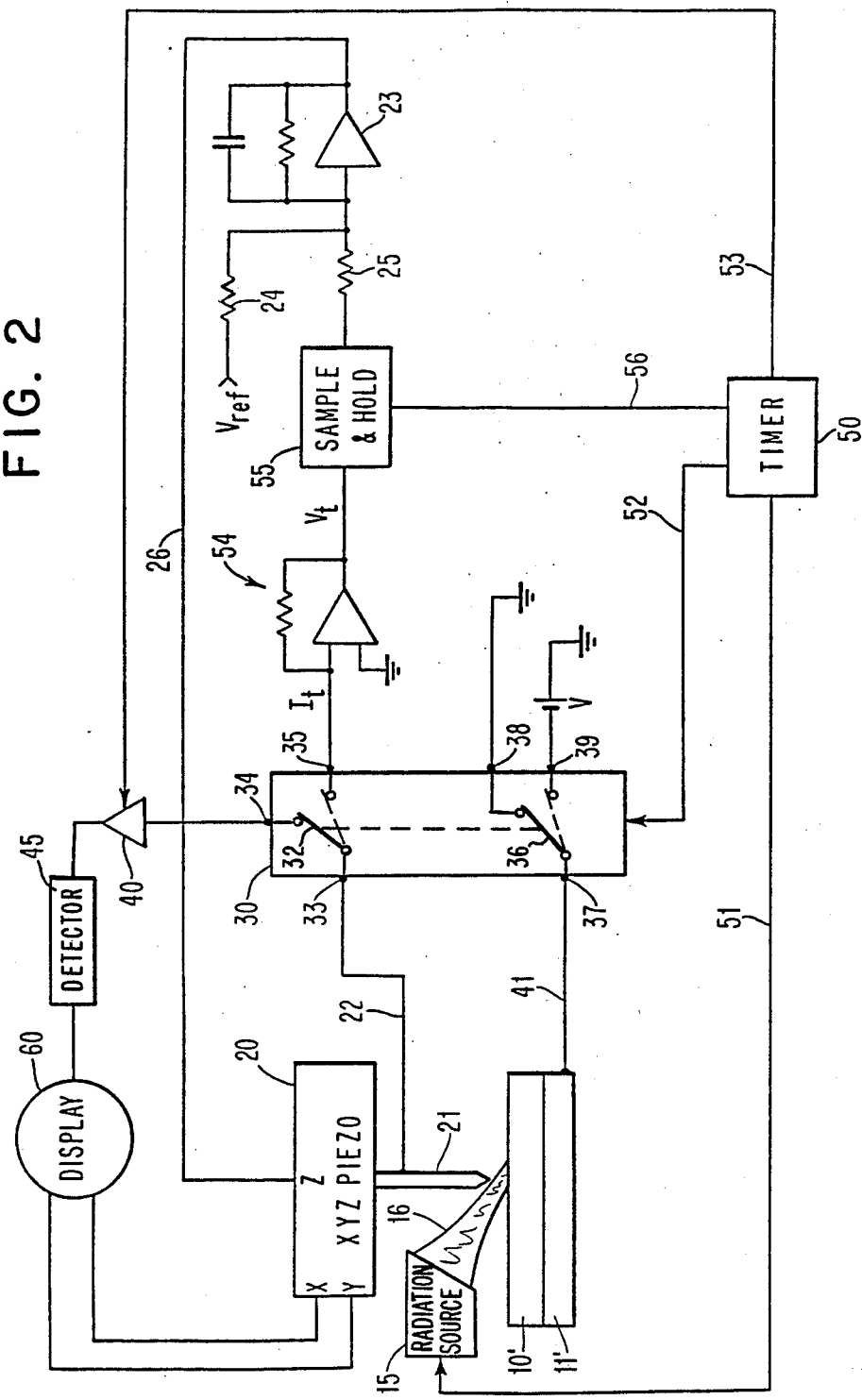
FIG. 2 is an alternative suited for thin biological samples.

In FIG. 2 the relationship between the tunneling tip, the switching arrangement 30 and the circuitry connected thereto, including the XYZ piezoelectric drive 20 is identical to that of FIG. 1. FIG. 2 differs from FIG. 1 in that the sample 10' being investigated can be a thin biological film or a thin dielectric film (typically less than 2 nanometers) which is in turn supported on a conductive film 11'. In the embodiment shown in FIG. 2, the tunneling takes place between the tunneling tip 21 and the conductive film 11'. The focused energy 16 emanating from the source 15 is focused on the point of the sample 10' being investigated, i.e. that point opposite the tunneling tip 21. In other respects, the apparatus of FIG. 2 operates in a fashion identical to that explained with respect to FIG. 1.

As mentioned, while the embodiments of FIGS. 1 and 2 employ STM techniques for maintaining the separation of the tip 21, the use of STM techniques for this purpose is not essential. Rather, other techniques such as atomic force microscopy or capacitance microscopy can be substituted in lieu of STM techniques. An advantage of using techniques other than STM is that when using techniques other than STM, since the techniques do not rely on tunneling current, the switching arrangement 30 can be eliminated.

Figure 3:
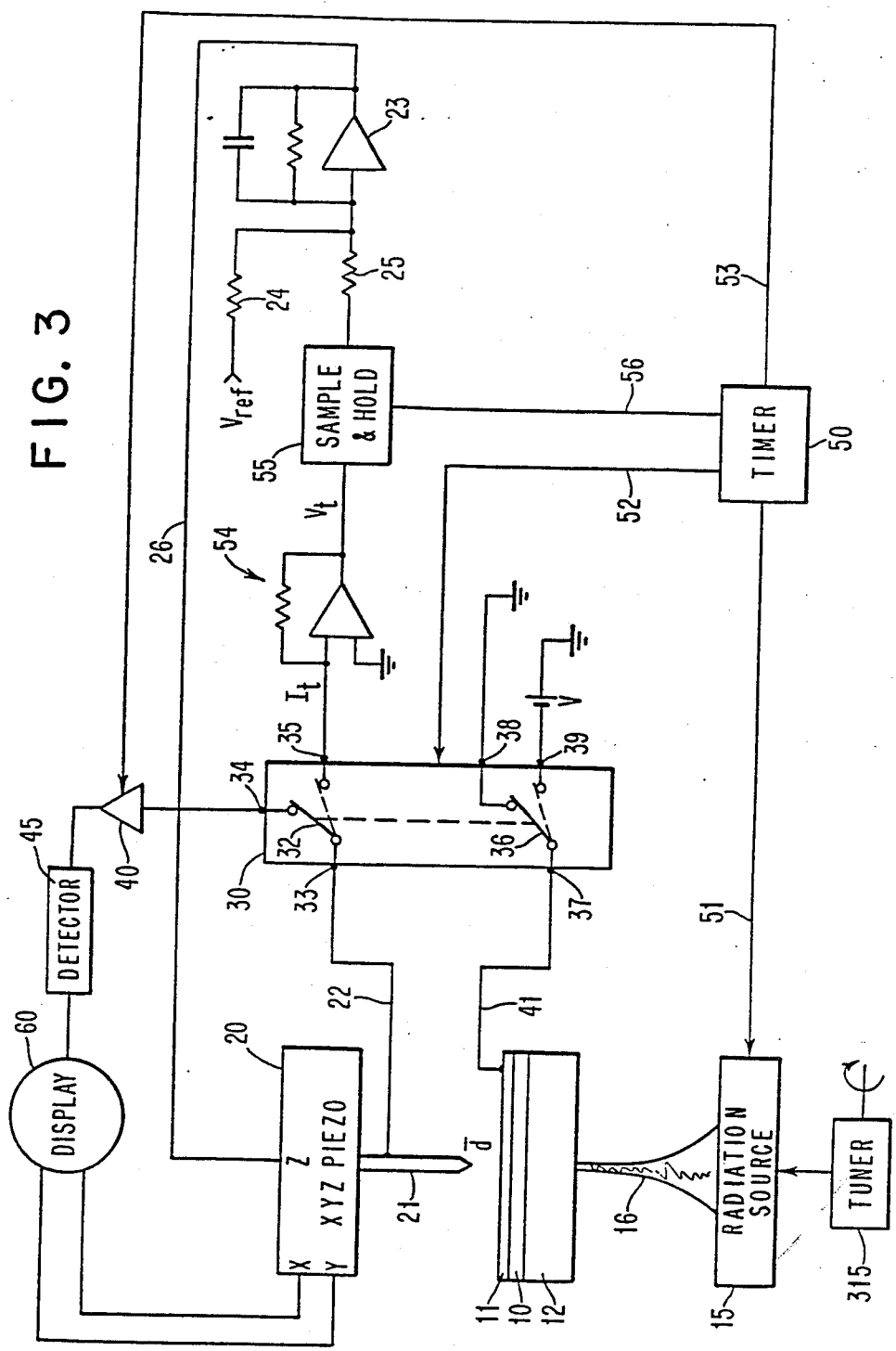
FIG. 3 is a schematic similar to FIG. 1 but, by the addition of tuner 315, allows for spectroscopy applications.

Although the foregoing description has concentrated on microscopy applications, those skilled in the art will understand that spectroscopy applications can also be implemented using the same architecture by merely providing for tuning of the source 15 FIG. 3 for example, which is similar to FIG. 1, differs therefrom by the use of a frequency controller or a tuner 315 for varying the frequency or wavelength of the energy generated by the source 15. By tuning the frequency or wavelength of the energy generated by the source 15, measurements can be made at different frequencies or wavelengths.

Applications of the optical absorption microscope include optical spectroscopy of single molecules and the location of dye molecules selectively attached onto biological surfaces using immuno-fluorescence methods. It should enable protein sequencing and DNA sequencing through selectively staining the nucleotides with different dye molecules and spatially identifying them with the absorption microscope.

While several specific embodiments of the invention have been described, the invention should not be limited by that description and instead should be construed by the claims appended hereto.

I claim:

1. Apparatus for absorption measurements comprising:
   a sample with a conductive surface,
   means for supporting said sample for measurement,
   means for directing energy onto said sample to cause local heating of the sample,
   a thermal measurement tip,
   support means for maintaining said thermal measurement tip within about 10 A° of said conductive surface, and
   measurement means coupled to said thermal measurement tip for measuring a junction potential between said thermal measurement tip and said conductive surface.

2. Apparatus as recited in claim 1 wherein said sample is non conductive and said conductive surface comprises a thin conductive film supported by said sample and lying between said sample and said thermal measurement tip.

3. Apparatus as recited in claim 1 wherein said means for supporting said sample comprises a substrate transparent to said energy and interposed between said means for directing energy and said sample.

4. Apparatus as recited in claim 1 wherein said sample is non conductive, said means for supporting said sample comprises a support with said conductive surface, said means for directing said energy and said thermal measurement tip are located adjacent one surface of said sample and said conductive surface is adjacent a different surface of said sample.

5. Apparatus as recited in claim 1 further comprising mapping means supporting the thermal measurement tip and the support means for providing relative movement between the thermal measurement tip and the sample so as to scan a region of the sample.

6. Apparatus as recited in claim 1 wherein said support means comprises tunneling current means for maintaining separation between said thermal measurement tip and said sample, said tunneling current means including:
   a piezoelectric drive for controlling movement of said thermal measurement tip toward and away from said sample,
   a two position switch,
   an operational amplifier with an output coupled to said piezoelectric drive, said operational amplifier having an input connected through said two position switch, in a first position, to said thermal measurement tip for conducting tunneling current from said thermal measurement tip, and
   wherein said measurement means comprises
   a current detector, an amplifier with an output connected to said current detector and an input connected through said two position switch, in a second position, to said thermal measurement tip.

7. Apparatus as recited in claim 1 wherein
   said means for directing energy directs time modulated energy onto said sample and wherein
   said measurement means detects an AC junction potential between said thermal measurement tip and said conductive surface.

8. Apparatus as recited in claim 7 which further includes timing means for enabling said means for directing energy and for controlling the position of said two position switch.

9. Apparatus as recited in claim 1 for absorption spectroscopy wherein said means for directing energy includes tuning means for varying a wavelength of energy directed onto said sample as a function of time.

10. A method or effecting absorption measurements comprising:
   (a) supporting a sample with a conductive surface for measurement,
   (b) directing energy onto said sample to cause local heating of the sample,
   (c) supporting a thermal measurement tip sufficiently close to said conductive surface to equalize Fermi levels between said tip and surface, and
   (d) measuring a junction potential between said thermal measurement tip and said conductive surface.

11. A method as recited in claim 10 wherein said step (c) maintains a separation between said thermal measurement tip and said conductive surface of about 10 Angstroms.

12. A method as recited in claim 10 or 11 wherein said step (b) further includes tuning a wavelength of the energy directed at said sample as a function of time.

13. A method as recited in claim 10 or 11 wherein said step (a) includes providing a substrate transparent to said energy and directing said energy through said substrate to said sample.

14. A method as recited in claim 10 or 11 wherein said sample is non conductive, said step (a) includes providing a support with said conductive surface, said step (b) includes directing said energy toward one surface of said sample and maintaining said conductive surface adjacent a different surface of said sample.

15. A method as recited in claim 10 which further includes mapping said the thermal measurement tip relative to the sample so as to scan a region of the sample.

16. A method as recited in claim 11 wherein said step (c) includes (ci) generating tunneling current between said thermal measurement tip and the sample, and (cii) monitoring said tunneling current to maintain said separation.

17. A method as recited in claim 16 wherein said monitoring step is interrupted when said measurement of step (d) is effected.

18. A method as recited in claim 10 or 11 wherein said step (b) includes time modulating said energy and said step (d) includes detecting an AC junction potential between said thermal measurement tip and said conductive surface 19. A method as recited in claim 18 wherein said step (c) includes (ci) generating tunneling current between said thermal measurement tip and the sample, and (cii) monitoring said tunneling current to maintain said separation.

20. A method as recited in claim 19 wherein said monitoring step is interrupted when said measurement of step (d) is effected.

21. A method as recited in claim 12 wherein said step a) includes providing a substrate transparent to said energy and directing said energy through said substrate to said sample.

22. A method as recited in claim 12 wherein said sample is non conductive, said step (a) includes providing a support with said conductive surface, said step (b) includes directing said energy toward one surface of said sample and maintaining said conductive surface adjacent a different surface of said sample.

* * * * *